(12) United States Patent
Kim et al.

(10) Patent No.: US 10,753,372 B2
(45) Date of Patent: Aug. 25, 2020

(54) DIRECT DRIVE TYPE DUAL TURBO BLOWER COOLING STRUCTURE

(71) Applicant: TURBOWIN CO., LTD., Cheongju-si, Chungcheongbuk-do (KR)

(72) Inventors: Minsoo Kim, Daejeon (KR); Youngkyu Park, Cheongju-si (KR)

(73) Assignee: TURBOWIN CO., LTD., Cheongju-si, Chungcheongbuk-do (KR)

( * ) Notice: Subject to any disclaimer, the term of this patent is extended or adjusted under 35 U.S.C. 154(b) by 268 days.

(21) Appl. No.: 15/752,763

(22) PCT Filed: Apr. 22, 2016

(86) PCT No.: PCT/KR2016/004222
§ 371 (c)(1),
(2) Date: Feb. 14, 2018

(87) PCT Pub. No.: WO2017/039108
PCT Pub. Date: Mar. 9, 2017

(65) Prior Publication Data
US 2018/0238347 A1    Aug. 23, 2018

(30) Foreign Application Priority Data
Sep. 4, 2015 (KR) ........................ 10-2015-0125254

(51) Int. Cl.
*F04D 29/58* (2006.01)
*H02K 5/20* (2006.01)
(Continued)

(52) U.S. Cl.
CPC ....... *F04D 29/5806* (2013.01); *F04D 17/105* (2013.01); *F04D 25/0606* (2013.01);
(Continued)

(58) Field of Classification Search
CPC ........ F04D 17/10; F04D 17/105; F04D 17/16; F04D 17/162; F04D 25/06;
(Continued)

(56) References Cited

U.S. PATENT DOCUMENTS 1,431,907 A * 10/1922 Cramer ..................... A47L 5/22
417/371
2,321,126 A * 6/1943 Breuer .................. F04D 25/082
417/367
(Continued)

FOREIGN PATENT DOCUMENTS

JP    2001-221187 A     8/2001
KR    10-2001-0064020 A   7/2001
(Continued)

*Primary Examiner* — Alexander B Comley
(74) *Attorney, Agent, or Firm* — Rabin & Berdo, P.C.

(57) ABSTRACT

The present invention relates to a direct drive type dual turbo blower cooling structure and, more particularly, to a direct drive type dual turbo blower cooling structure in which a plurality of hole portions for cooling a stator and a plurality of hole portions for cooling a coil portion, a bearing housing, and a rotor are formed along the inner diameter of a motor casing; impellers are disposed on both sides thereof, such that a flow rate is doubled; and an air cooling system capable of achieving thermal balance through the plurality of hole portions is implemented at the time of operation of a cooling fan which provides an air cooling system instead of a conventional water cooling system. As such, it is possible to simplify the mechanical structure and reduce manufacturing time and costs because the pump, heat exchanger, water tank, pipes, etc. required for a water cooling system are unnecessary.

3 Claims, 7 Drawing Sheets

(51) Int. Cl.
*H02K 9/06* (2006.01)
*F04D 17/10* (2006.01)
*F04D 25/06* (2006.01)
*F04D 25/08* (2006.01)
*F04D 25/16* (2006.01)
*H02K 1/20* (2006.01)

(52) U.S. Cl.
CPC ......... *F04D 25/082* (2013.01); *F04D 25/166* (2013.01); *H02K 5/20* (2013.01); *H02K 9/06* (2013.01); *H02K 1/20* (2013.01)

(58) Field of Classification Search
CPC ........ F04D 25/08–25/082; F04D 25/16; F04D 25/166; F04D 29/424; F04D 29/4226; F04D 29/5806; F04D 29/58–29/582; F04D 29/584; H02K 1/20; H02K 1/32; H02K 5/20; H02K 9/02–9/06
USPC .............. 417/366–371, 423.1, 423.7, 423.8, 417/423.11, 423.12, 423.14
See application file for complete search history.

(56) References Cited

U.S. PATENT DOCUMENTS

| | | | | | |
|---|---|---|---|---|---|
| 3,088,042 | A * | 4/1963 | Robinson | ................. | H02K 9/20 310/54 |
| 3,341,113 | A * | 9/1967 | Sebok | .................. | F04D 17/164 417/368 |
| 3,407,739 | A * | 10/1968 | Myers | ....................... | F04D 7/02 417/423.14 |
| 3,521,978 | A * | 7/1970 | Enemark | ................. | F23K 5/145 417/201 |
| 4,518,325 | A * | 5/1985 | Kingston | ............. | A61H 33/028 417/368 |
| 4,527,960 | A * | 7/1985 | DeSisto | ................ | F04D 29/102 417/368 |
| RE32,027 | E * | 11/1985 | Hyatt | .................... | F04D 25/082 15/413 |
| 4,616,980 | A * | 10/1986 | Carpenter | ........... | F04D 29/5866 417/357 |
| 4,767,285 | A * | 8/1988 | Jyoraku | .................. | F04D 25/06 417/366 |
| 5,350,281 | A * | 9/1994 | Hagshenas | ........... | F04D 25/082 415/144 |
| 5,567,127 | A * | 10/1996 | Wentz | ....................... | A47L 7/00 415/119 |
| 5,857,348 | A * | 1/1999 | Conry | ..................... | F04D 25/06 62/209 |
| 6,011,331 | A * | 1/2000 | Gierer | .................... | H02K 29/06 310/52 |
| 6,102,672 | A * | 8/2000 | Woollenweber | ......... | H02K 9/06 417/366 |
| 6,488,475 | B2 * | 12/2002 | Murata | ...................... | A47L 5/22 417/32 |
| 6,579,078 | B2 * | 6/2003 | Hill | ....................... | F04D 17/122 417/228 |
| 6,616,421 | B2 * | 9/2003 | Mruk | ...................... | F04D 17/12 310/154.01 |
| 7,240,515 | B2 * | 7/2007 | Conry | .................... | F04D 25/06 62/510 |
| 8,608,457 | B2 * | 12/2013 | Coenraets | ............ | H02K 7/1012 417/368 |
| 9,074,604 | B2 * | 7/2015 | Konishi | ................. | F04D 17/164 |
| 2003/0059315 | A1 * | 3/2003 | Choi | ..................... | F04D 17/122 417/228 |
| 2003/0198563 | A1 * | 10/2003 | Angle | ....................... | F04D 1/12 417/423.7 |
| 2006/0013712 | A1 * | 1/2006 | Lee | .......................... | F04D 31/00 417/423.7 |
| 2008/0014080 | A1 * | 1/2008 | Fang | ......................... | A47L 5/22 415/191 |
| 2011/0135519 | A1 * | 6/2011 | Cho | ........................... | F04D 17/10 417/423.7 |
| 2013/0136629 | A1 * | 5/2013 | Maier | .................... | F04D 17/122 417/366 |
| 2014/0292122 | A1 * | 10/2014 | Pal | ............................ | H02K 5/20 310/59 |
| 2015/0171689 | A1 * | 6/2015 | Wada | ...................... | F04D 25/06 417/423.7 |
| 2015/0247506 | A1 * | 9/2015 | Lee | ........................ | F04D 17/105 417/366 |

FOREIGN PATENT DOCUMENTS

| | | |
|---|---|---|
| KR | 10-0572849 B1 | 4/2006 |
| KR | 10/2014/0017925 A | 2/2014 |
| KR | 10-1372320 B1 | 3/2014 |
| KR | 10-1377057 B1 | 3/2014 |
| KR | 10-1464705 B1 | 12/2014 |

* cited by examiner

DIRECT DRIVE TYPE DUAL TURBO BLOWER COOLING STRUCTURE

TECHNICAL FIELD

The present invention relates to a direct drive type dual turbo blower cooling structure and, more particularly, to a direct drive type dual turbo blower cooling structure which includes a plurality of holes for cooling a stator along an outer diameter of a motor casing, a plurality of holes for cooling a coil part, a bearing housing, and a rotor, and impellers at both sides to increase flow rate and realize an air cooling type which can achieve thermal balance through a plurality of holes when a cooling fan not for water cooling type of the related art, but for an air cooling type is operated, and thus has a simple mechanical structure without a pump, a heat exchanger, a water tank, and pipes etc. required for a water cooling type, thereby reducing manufacturing time and cost.

BACKGROUND ART

Generally, a blower is a mechanical device that generates energy of a fluid. The blower includes of an impeller that generates a flow, and a casing that guides a flow coming into and going out the impeller.

There are various kinds of methods of dividing the blower and they are divided into an axial blower, a radial blower, and a mixed blower according to the characteristics of the flow passing through the impeller.

For example, a radial type blower is mainly used for increasing a pressure due to a centrifugal force. Therefore, it is widely used where pressure is required rather than flow rate.

Also, in case of a centrifugal type blower, a helical casing is used in such a manner that an inlet flow of the impeller is in a direction of the rotation axis and the outlet flow thereof is in a direction perpendicular to the rotation axis or a tubular casing is used in such a manner that the inlet flow and the outlet flow of the impeller are in a direction of the rotation axis.

A turbo blower, which is a type of centrifugal blower, refers to a centrifugal blower having a relatively high pressure ratio. The impeller is rotated at a high speed in a vessel to radially flow the gas. In the centrifugal blowers using a centrifugal force, it refers to a turbo ventilator having a small pressure ratio and refers to the centrifugal type blower, that is, the turbo blower having a pressure ratio larger than the turbo ventilator.

The turbo blower includes a main body that forms an outer appearance, a driving unit that is provided inside the main body and substantially pressurizes the air, and a control unit that controls the driving of the driving unit. The air, which is introduced into the main body through the air inlet formed at the main body, is pressurized above a certain pressure to be discharged.

However, in the related art, the noise generated in the internal driving unit is largely transmitted to the outside. Also, since the internal structure for properly cooling the internal components of the driving unit is not provided, there are defects in that the lifespan of the internal components is reduced and the durability of the entire driving unit is reduced.

The cooling usually utilizes a method using an intake air or a gas flowing into the impeller. Or, a method of blowing a large amount of air therein through an air gap formed between a rotor and a stator or a cooling hole formed in the stator can be utilized.

In the former method, the power required for cooling is small, but it has a disadvantage that the sensitivity to the impeller is very high because the cooling system itself is closely interlocked with the impeller.

That is, since the structure of the cooling system is changed according to the design shape of the impeller, the degree of freedom of design is greatly restricted.

In addition, there is a problem in that the entire size of the turbo device is increased due to the characteristics of the cooling system.

The latter method has a disadvantage in that the cooling efficiency is very low because it has a structure of blowing a large amount of air therein by a considerable pressure by using a cooling fan.

Accordingly, a cooling system that relies on a cooling fan has a problem of consuming a relatively large amount of power in order to maintain an appropriate level of cooling. Since the introduced air cools the entire interior thereof, it is not enough to provide a regular cooling for each component. As a result, the cooling efficiency thereof is reduced.

On the other hand, a both-end type turbo blower has been developed in the related art, but since impellers are disposed at both sides, there is a spatial limit in installation of a fan, and accordingly, a water cooling type and an impeller intake air type have been used.

In the water cooling type, since the subsidiary materials for cooling such as a pump, a heat exchanger, a water tank, a pipe, etc. are considerably necessary, the cost is increased. Also, in order to affix them thereto, since the separate space is necessary in the package, there is a disadvantage in that the equipment becomes bigger.

In addition, if a leak occurs, it may lead to big accidents owing to the equipment that uses high voltage.

In the method using the impeller intake air, since the intake air cools the internal components to be heated, the impeller inhales the air having low density. Thus, it is smaller than the room temperature in terms of flow rate thereof and the efficiency thereof is lowered.

Further, in order to accurately measure the flow rate, it requires a nozzle. However, there is a drawback in that it is not possible to affix the nozzle thereto.

That is, in the conventional both-end type turbo blower, turbo blower, since it is difficult to configure and install the fan, it has no choice but to use the water cooing method and the air cooling method using the impeller intake air, though the manufacturing cost is increased and the efficiency is lowered.

Therefore, a direct drive-type turbo blower cooling structure for thermal balance is needed.

Patent Literature

Patent Literature 1: Korean Patent Registration No. 10-0572849 (Apr. 24, 2006)

DISCLOSURE

Technical Problem

The present invention has been made in consideration of the problems described above and an object of the present invention is to increase a flow rate by including a plurality of holes for cooling a stator along an outer diameter of a motor casing, a plurality of holes for cooing a coil part, a bearing housing, and a rotor, and impellers at both sides and to provide thermal balance by improving cooling efficiency through the plurality of holes when a cooling fan not for water cooling type of the related art, but for an air cooing type is operated.

That is, impellers and scroll volutes are disposed at both sides in a dual type and a cooling fan is disposed in front of one of the impellers, thereby increasing a flow rate and providing an air cooling effect in an air cooling type from the operation of the cooling fan. In particular, by forming a plurality of holes so that components can be uniformly cooled by maximizing the intake amount of air and the contact areas with air for cooling a stator, a coil part, a bearing, and a rotor disposed inside a motor casing when the cooling fan is operated, whereby thermal unbalance due to the partial cooling of only any one component is prevented.

Technical Solution

According to one aspect of the present invention so as to accomplish these objects, there is provided to the direct type dual turbo blower cooling structure including:

a cylindrical motor casing (100);

a stator (200) embedded in the motor casing and including a rotor (250) therein;

core rings (300) formed on both sides of the stator and having a cooling air passage holes (310) through which air passes;

a left back plate (400) having a hole through which one side of the rotor passes;

a left cap (500) having one surface coupled to the left back plate and including a seal formed to prevent a fluid generated by coupling the other side to the first scroll volute from being leaked;

a right back plate (600) formed between the motor casing and a cooling fan;

bearing housings (700, 700') having a bearing for rotatably supporting the rotor;

a first impeller (800) formed on one surface of the left cap;

a first scroll volute (900) covering one side of the first impeller, guiding flowing generated from the first impeller, and converting kinetic energy of fluid into potential energy;

a first scroll shroud (1000) coupled to one side of the first scroll volute so as to surround the first impeller and generating hydraulic pressure by making the air flow smoothly when the first impeller is rotated at a high speed;

a first nozzle (1100) as a suction port through which the air flows and coupled to one side of the first scroll shroud (1000);

a cooling fan (1200) coupled to one side of the right back plate;

a fan shroud (1250) formed on one side of a right cap to prevent fluid from leaking outside;

a fan scroll (1300) covering the cooling fan and discharging fluid to the outside;

a cooling duct (550) coupled to one side of the fan scroll to discharge cooling air;

a right cap (500') formed on one side of the right back plate;

a second impeller (800') formed on one side of the right cap;

a second scroll volute (900') covering one side of the second impeller, guiding flowing generated from the second impeller, and converting kinetic energy of fluid into potential energy;

a second scroll shroud (1000') coupled to one side of the second scroll volute so as to surround the second impeller and generating hydraulic pressure by making the air flow smoothly when the second impeller is rotated at a high speed; and a second nozzle (1100') as a suction port through which the air flows and coupled to one side of the second scroll shroud.

Advantageous Effects

According to the direct drive type dual turbo blower cooling structure of the present invention, there is an effect in that it is to increase a flow rate by including a plurality of holes for cooling a stator along an outer diameter of a motor casing, a plurality of holes for cooing a coil part, a bearing housing, and a rotor, and impellers at both sides and to provide thermal balance by improving cooling efficiency through the plurality of holes when a cooling fan not for water cooling type of the related art, but for an air cooing type is operated.

That is, there is another effect in that impellers and scroll volutes are disposed at both sides in a dual type and a cooling fan is disposed in front of one of the impellers, thereby increasing a flow rate and providing an air cooling effect in an air cooling type from the operation of the cooling fan. In particular, by forming a plurality of holes so that components can be uniformly cooled by maximizing the intake amount of air and the contact areas with air for cooling a stator, a coil part, a bearing, and a rotor disposed inside a motor casing when the cooling fan is operated, whereby thermal unbalance due to the partial cooling of only any one component is prevented.

There is further another effect in that it realizes an air cooling type which can achieve thermal balance through a plurality of holes and thus has a simple mechanical structure without a pump, a heat exchanger, a water tank, and pipes etc. required for a water cooling type, thereby reducing manufacturing time and cost.

BRIEF DESCRIPTION OF DRAWINGS

The above and other objects, features and advantages of the present invention will be more apparent from the following detailed description taken in conjunction with the accompanying drawings, in which.

REFERENCE SIGNS LIST

100: motor casing
200: stator
250: rotor
300: core ring
400: left back plate
500: left cap
600: right back plate 700: bearing housing
800: first impeller
800': second impeller
900: first scroll volute
900': second scroll volute
1000: first scroll shroud
1000': second scroll shroud
1100: first nozzle
1100': second nozzle
1200: cooling fan
1300: fan scroll

BEST MODE

Mode for Invention

Since the description of the present invention is a mere embodiment for structural and functional description, it must not be interpreted that the scope of the present invention is limited by the embodiments described in the text. That is, since the embodiments can be variously changed and have various forms, it should be understood that the scope of the invention includes the equivalents for realizing the technical concept. Also, since the specific embodiments do not include all objects and effects presented by the present invention, the scope of the present invention is not limited by them.

Therefore, the implementation examples of this invention are nothing more than simple examples in all respects and will not be interpreted restrictively.

Even though the terms such as 1, 2, and others can be used to explain many components, the above components shall not be limited by the above terms.

The terms used in this application do not intend to limit this invention, but are used only to explain specific implementation examples. The singular expression includes plural expressions unless it is apparently different in the context.

The terms such as "include", "equipped" or "have" in this application intend to designate that the feature, number, stage, movement, component, part or the combination described in the specification exist. Therefore, it will be understood that the existence or the additional possibility of one or more than one different features, numbers, stages, actions, components, parts and the combination is not excluded in advance.

Hereinafter, a preferred embodiment according to the present invention will be described in detail with reference to the accompanying drawings.

A both-end type turbo blower has been developed in the related art, but since impellers are disposed at both sides, there is a spatial limit in installation of a fan, and accordingly, a water cooling type has been used.

That is, the most important problem of the both-end type turbo blower in the related art is that it is impossible to install a fan.

Further, common turbo blowers employ a method of blowing air, so thermal balance cannot be maintained among internal parts.

However, the present invention employs a method of suctioning air at both sides in a dual type, whereby it increases a flow rate by disposing impellers at both sides and provide thermal balance by improving cooling efficiency through a plurality of holes when a cooling fan not for water cooling type of the related art, but for an air cooing type is operated.

That is, cooling can be simultaneously and quickly performed by using a dual structure, whereby thermal balance is possible.

Figure 1:
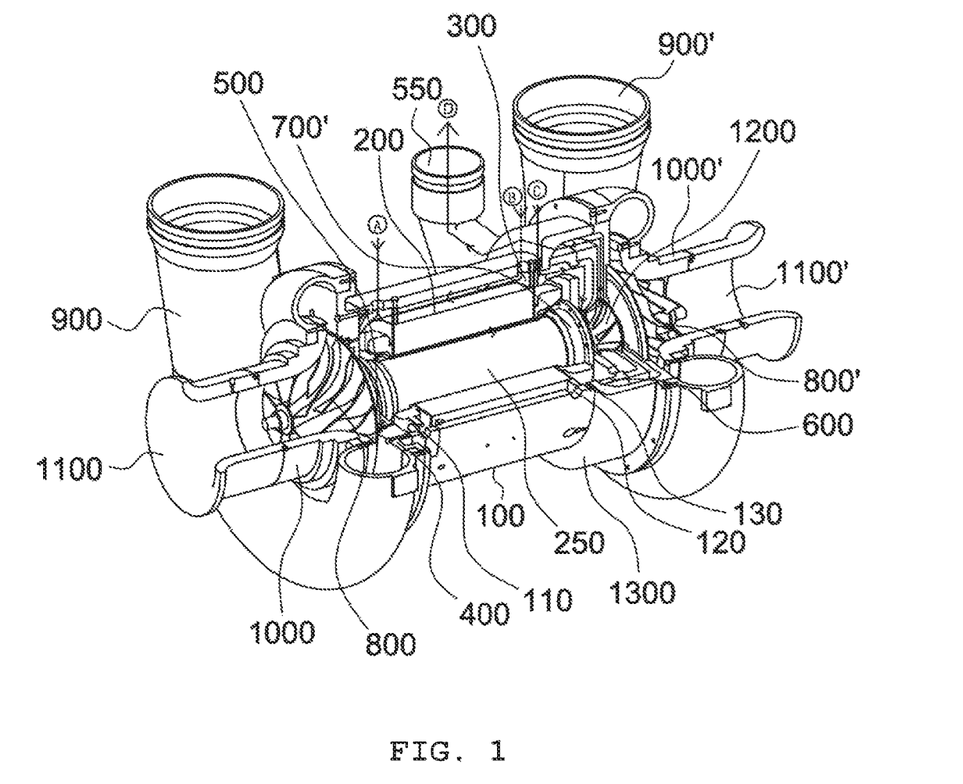
FIG. 1 is a cut-out perspective view of a direct drive type dual turbo blower cooling structure according to an embodiment of the present invention.
Figure 2:
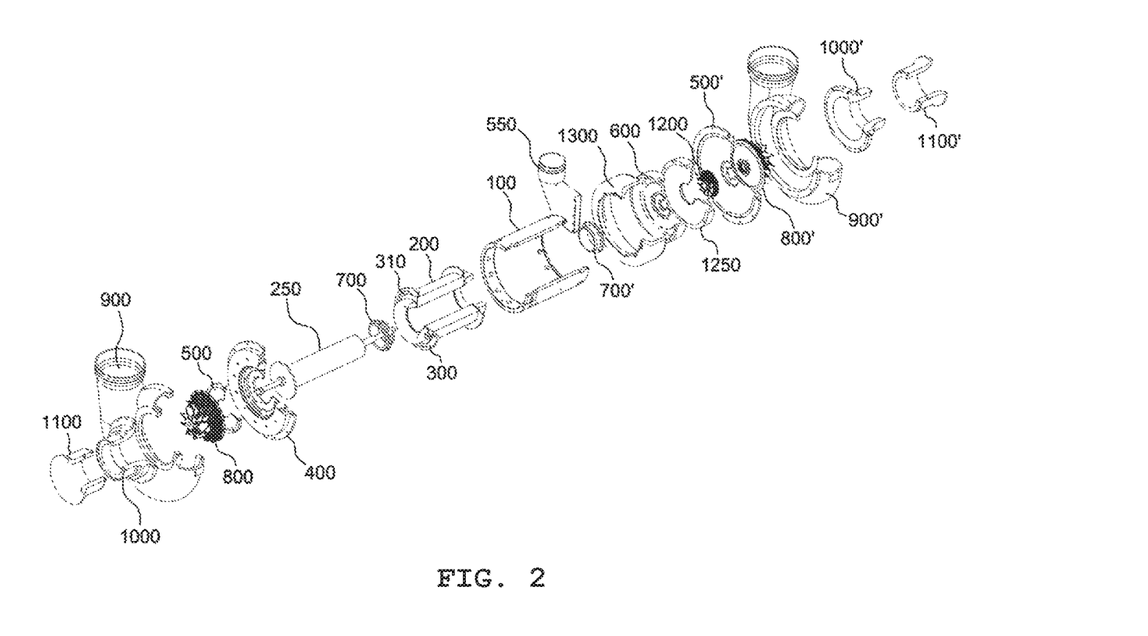
FIG. 2 is an exploded perspective view of the direct drive type dual turbo blower cooling structure according to the embodiment of the present invention.
Figure 3:
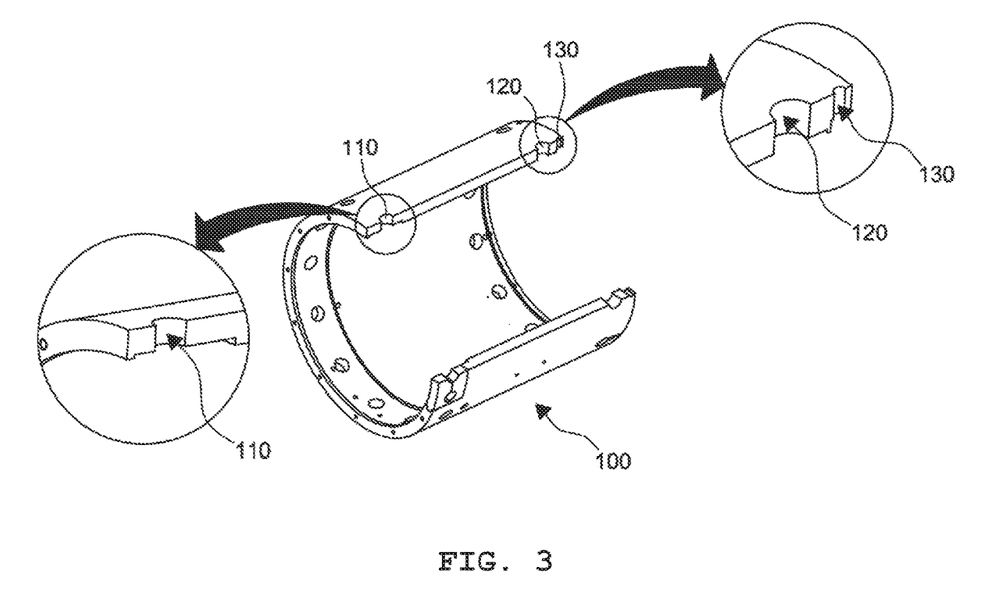
FIG. 3 is a cross-sectional view illustrating a first hole, a second hole, and a third hole formed at a motor casing of the direct drive type dual turbo blower cooling structure according to the embodiment of the present invention.
Figure 4:
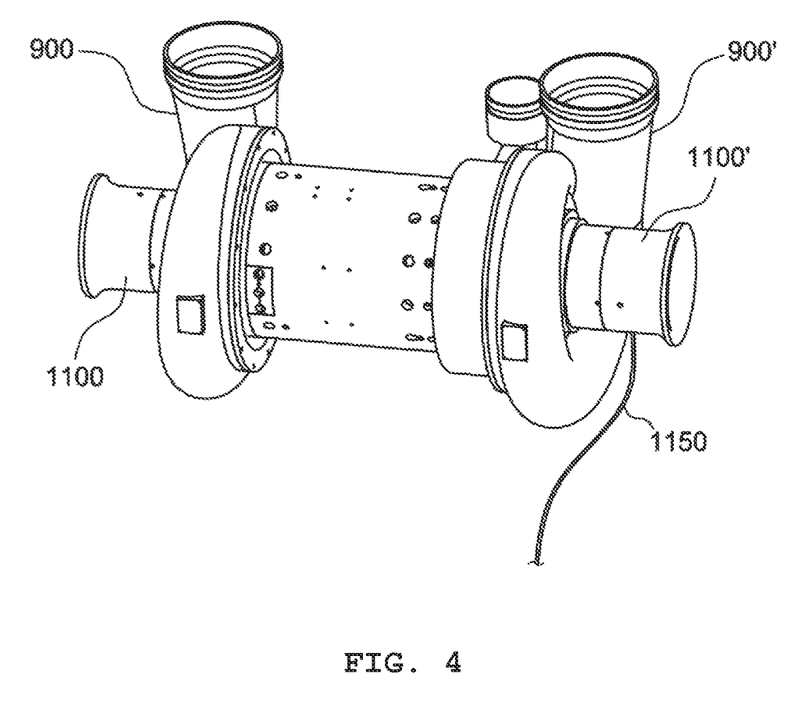
FIGS. 4 to 7 are photographs of the direct drive type dual turbo blower cooling structure according to the embodiment of the present invention.
Figure 5:
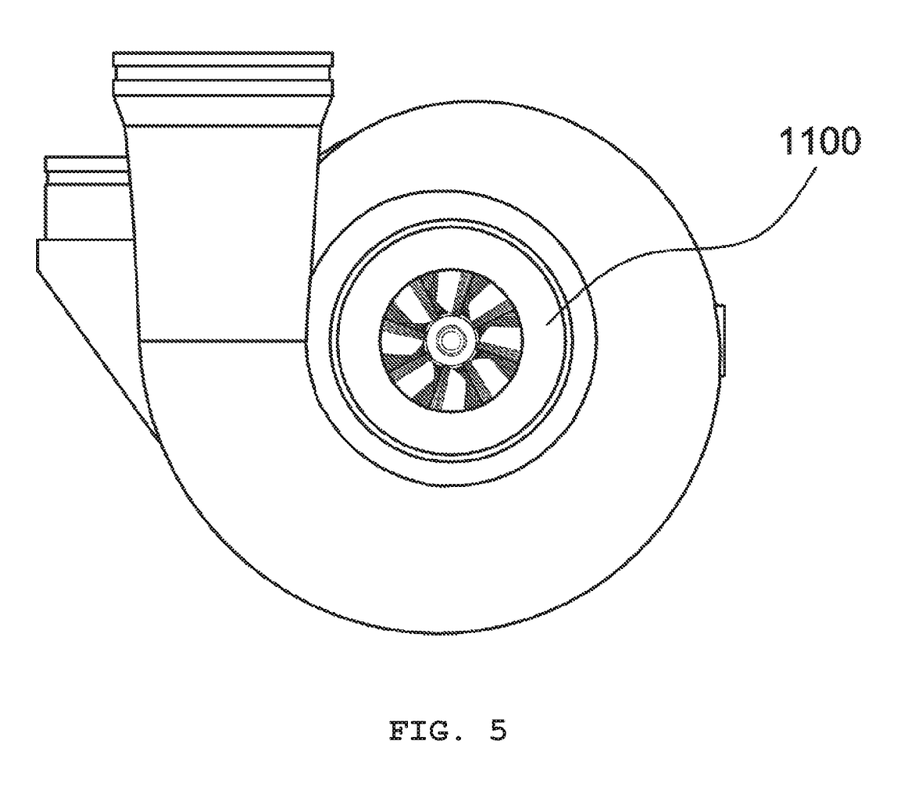
Figure 6:
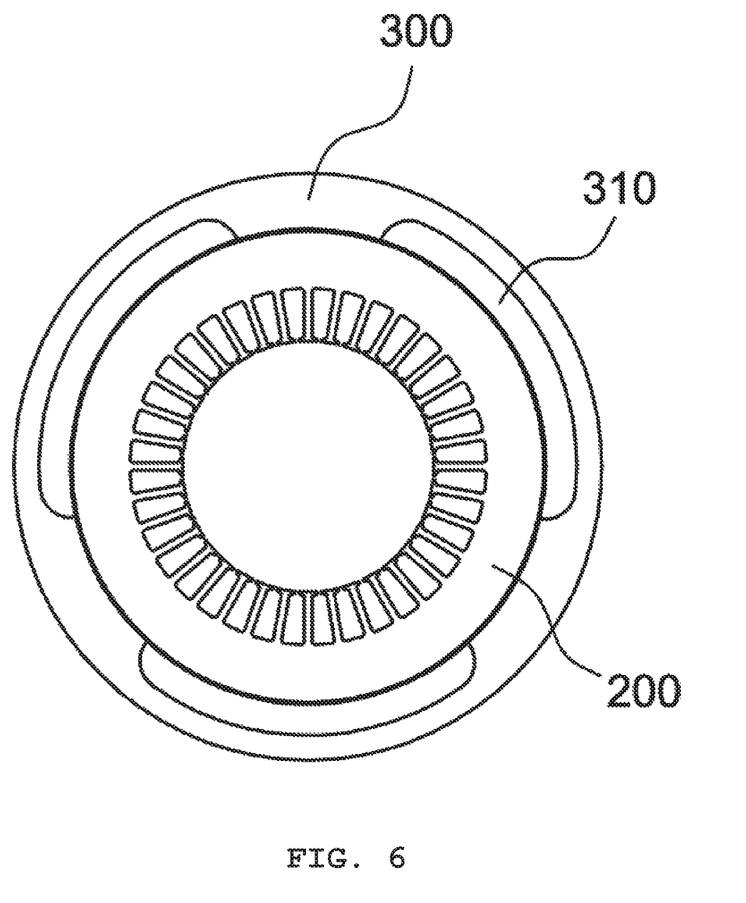
Figure 7:
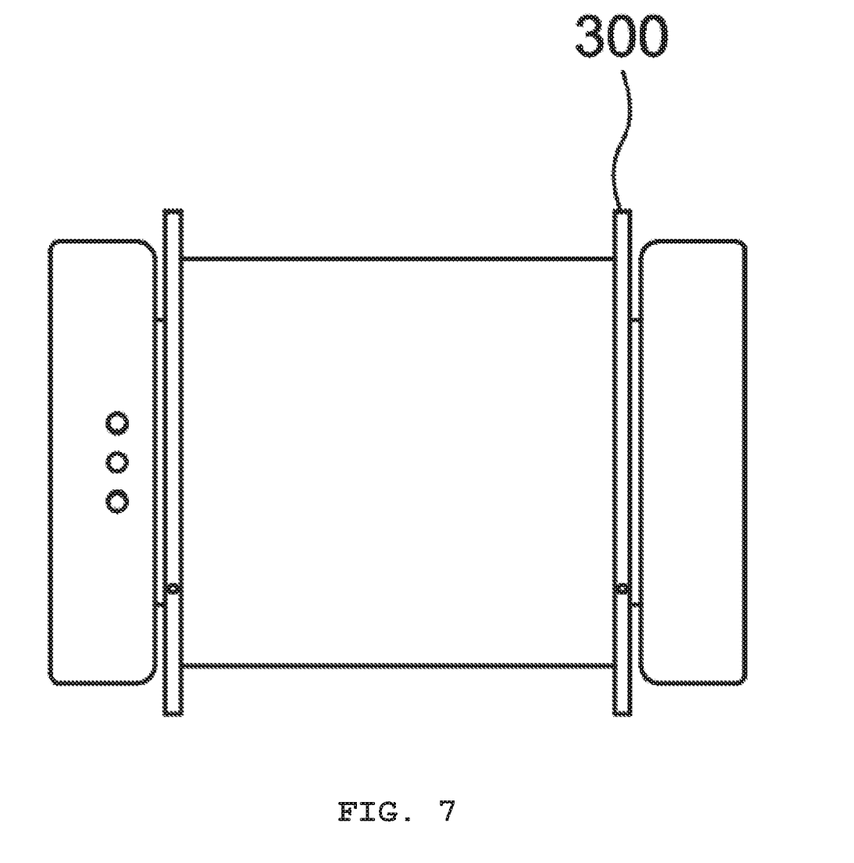

As shown in FIGS. 1 to 3, a direct type dual turbo blower cooling structure of the present invention includes: a motor casing (100); a stator (200); core rings (300); a left back plate (400); a left cap (500); a right back plate (600); a bearing housing (700); a first impeller (800); a first scroll volute (900); a first scroll shroud (1000); a first nozzle (1100); a cooling fan (1200); a fan scroll (1300); a second impeller (800'); a second scroll volute (900'); a second scroll shroud (1000'); and a second nozzle (1100').

That is, the present invention includes: the motor casing (100); the stator (200); the core rings (300); the left back plate (400); the left cap (500); the right back plate (600); the bearing housing (700); the cooling fan (1200); and the fan scroll (1300).

The first impeller (800), the first scroll volute (900), the first scroll shroud (1000), and the first nozzle (1100) are disposed at a side.

Further, the second impeller (800'), the second scroll volute (900'), the second scroll shroud (1000'), and the second nozzle (1100') are disposed at the other side.

According to the structure, impellers are disposed at both sides, and the right back plate (600), the fan shroud (1250), and the fan scroll (1300) for constituting a cooling fan is disposed inside the impellers, whereby the cooling fan is firmly combined.

The motor casing (100) is formed in a cylindrical shape and the stator (200) including a rotor 250 is configured in the motor casing.

The rotor is referred to as a rotor functioning as a rotational axis and the stator rotates the rotor by generating a magnetic field due to current which flows by a coil part wound on the stator.

The core rings (300) are disposed on both sides of the stator and have a plurality of cooling air passage holes (310) through which air passes.

The left back plate (400) has a hole at a central portion for passing a side of the rotor and the left cap (500) is coupled to a surface of the left back plate.

The other side of the left cap acts as a blocking plate for preventing a fluid generated by coupling to the scroll volute from being leaked.

The left cap (500) is coupled on a surface to the left back plate.

The right back plate (600) is formed between the motor casing and the cooling fan.

Of course, it is natural that a center hole is formed at the central portion so that the rotor penetrates the central portion.

A bearing housing (700) having a bearing for rotatably supporting the rotor on one surface of the right back plate is disposed on sides of disks on both sides of the rotor.

A fan shroud (1250) may be further disposed between the right cap and the right back plate to prevent from leaking outside and help airflow of the cooling air.

The right cap (500') is coupled on one surface to the right back plate and may include a seal coupled on the other side to the second scroll volute to prevent leakage of fluid.

The first impeller (800) is formed on one surface of the left cap, the first scroll volute (900) surrounds one side of the first impeller, and flow generated by the first impeller is guided such that kinetic energy of fluid is converted into potential energy.

It is characterized in that the flow generated by the first impeller is not provided in the direction of the motor casing.

Further, the first scroll shroud (1000) is coupled to a side of the first scroll volute so as to surround the first impeller, as a result, when the first impeller is rotated at a high speed, the air smoothly flows to generate hydraulic pressure.

The first nozzle (1100) is a suction port through which the air flows, and is formed to be coupled to one side of the first scroll shroud.

The second impeller (800') is formed on one surface of the right cap, the second scroll volute (900') surrounds one side of the second impeller, and flow generated by the second impeller is guided such that kinetic energy of fluid is converted into potential energy.

It is characterized in that the flow generated by the second impeller is not provided in the direction of the motor casing.

Further, the second scroll shroud (1000') is coupled to a side of the second scroll volute so as to surround the second impeller, as a result, when the second impeller is rotated at a high speed, the air smoothly flows to generate hydraulic pressure.

The second nozzle (1100') is a suction port through which the air flows, and is formed to be coupled to one side of the second scroll shroud.

The cooling fan (1200) is coupled to one side of the right back plate, and the fan scroll (1300) is configured to surround the cooling fan to discharge fluid to the outside.

That is, even using a dual type impeller that cannot be achieved in the related art, it is possible to dispose a cooling fan in the impellers, so it is possible to solve the problems in the water cooling type of the related art using an air cooling type.

To this end, the right back plate (600), fan scroll (1300), and fan shroud (1250) are provided to structurally couple the cooling fan.

Meanwhile, according to an additional aspect, a diffuser may be disposed between the scroll volutes (900 and 900') and the impellers (800 and 800'), and one side of the diffuser is coupled to the scroll volutes (900 and 900') to serve to smoothly reduce a flow rate of fluid and increase static pressure.

In order to achieve the objects of the present invention, the motor casing (100) include:

a plurality of first holes 110 formed along an outer diameter at a predetermined interval around the core ring facing the left back plate (400);

a plurality of second holes (120) formed along an outer diameter at a predetermined interval around the core ring facing the right back plate (600); and a plurality of third holes (130) having a diameter smaller than those of the first holes and the second holes and formed along an outer diameter around the core facing the right back plate (600) at a predetermined distance from the second holes.

This configuration provides a thermal balance effect.

That is, the first holes (110) are formed along an outer diameter at a predetermined interval around the core ring facing the left back plate (400).

As shown in FIGS. 1 and 3, the first holes (110) are formed along an outer diameter at a predetermined interval and positioned around the core ring facing the left back plate (400).

Further, the second holes 120 are formed along an outer diameter at a predetermined interval around the core ring facing the right back plate (600).

That is, as show in FIGS. 1 and 3, the second holes are formed around the core ring facing the right back plate (600).

In order to achieve thermal balance in this configuration, the third holes (130) having a diameter smaller than those of the first holes and the second holes are formed along an outer diameter around the core facing the right back plate (600) at a predetermined distance from the second holes.

As shown in FIGS. 1 and 3, the third holes are formed around the core ring facing the right back plate (600) at a predetermined distance from the second holes.

The holes have different positions, sizes, and regions on the basis of many test results, thereby providing thermal balance.

In detail, referring to the arrows in FIG. 1, when the cooling fan (1200) is operated, the stator (200) is cooled by air (B) introduced through the second holes (120). The coil part facing the first impeller (800), the bearing housing (700), and the rotor are cooled by air (A) introduced through the first holes and the air (B) introduced through the second holes. That is, an the bearing housing (700') facing the second impeller (800') and the coil part are cooled by an air mixture including the air (C) introduced through the third holes (130) and the air (A) and air (B) cooling the coil part, the bearing housing (700), and the rotor (250), and the air mixture has a decreased temperature. Air (D) having circulating through the spaces inside the motor casing (100) is discharged outside through a cooling duct (550) connected to the fan scroll (1300).

By controlling airflow as described above, the main parts of the dual turbo blower are uniformly cooled, so thermal balance can be provided.

As for the operation, when the rotor is rotated due to current flow, the impellers (800 and 800') on both ends of the rotor and the cooling fan are rotated together.

By the rotation of the cooling fan, the air sucked by the first holes, second holes and third holes cools the internal components of the motor casing and thereafter, is discharged to the outside.

First, the air (B) introduced through the second holes cools heat of the stator, flows to the coil part through the cooling air passage holes formed in the core ring, cools the coil part facing the first impeller and the bearing housing together with the air (A) introduced through the first holes, and cools the coil part facing the second impeller and the bearing housing (700') together with the air (C) introduced through the third holes.

According to the cooling structure of the present invention for cooling the turbo blower through such a path of the air flow passage as described above, since the outer and inner surfaces of the stator, the outer, inner and lateral surfaces of the coil part, the outer surface of the rotor, the outer surface of the bearing housing, the left back plate, the right back plate, and the like are uniformly cooled, so it is possible to achieve thermal balance by uniformly cooling heat that is generated when the turbo blower is operated.

Meanwhile, a terminal block is formed on the outer side of the motor casing (100) to provide a current to the stator, thereby rotating the rotor.

Further, by disposing port parts (1150) at both sides of the fist nozzle and the second nozzle, it may be possible to conveniently measure the flow rate.

According to the above constitution, the components can be uniformly cooled by maximizing the intake amount of air and the contact areas with air for cooling a stator, a coil part, a bearing, and a rotor disposed inside a motor casing when the cooling fan is operated, whereby thermal unbalance due to the partial cooling of only any one component is prevented.

While the present invention has been described with respect to the specific embodiments, it will be apparent to those skilled in the art that various changes and modifications may be made without departing from the spirit and scope of the present invention as defined in the following claims.

INDUSTRIAL APPLICABILITY

It can be usefully utilized in the cooling technology field of the turbo blower, because the plurality of hole portions is formed therein; the impellers are disposed on both sides thereof, such that a flow rate is doubled; and the air cooling system capable of achieving thermal balance through the plurality of hole portions is implemented at the time of operation of the cooling fan.

What is claimed is:

1. A direct type dual turbo blower cooling structure comprising:
   a cylindrical motor casing (100);
   a stator (200) embedded in the motor casing (100), the stator having a first end and a second end opposite the first end, the stator including a rotor (250) in the stator and a coil part wound around the stator, the coil part having a first end at the first end of the stator and a second end at the second end of the stator;
   first and second core rings (300) located at the first and second ends of the stator, respectively, the first and second core rings having cooling air passage holes (310) through which cooling air passes;
   a left back plate (400) at a first end of the motor casing, the left back plate having a hole through which one side of the rotor passes;
   a left cap (500) having one surface on a first side coupled to the left back plate and including a seal on a second side opposite the first side;
   a right back plate (600) at a second end of the motor casing opposite the first end of the motor casing;
   a cooling fan (1200) coupled to one side of the right back plate;
   a right cap (500') positioned on the one side of the right back plate, the cooling fan (1200) positioned between the right cap (500') and the right back plate (600);
   bearing housings (700, 700'), each bearing housing having therein a bearing for rotatably supporting the rotor;
   a first impeller (800) on the one surface of the left cap;
   a first scroll volute (900) covering one side of the first impeller, the first scroll volute shaped to guide a first flow of air generated by the first impeller, and to convert kinetic energy of the first flow of air into potential energy, the first scroll volute coupled to the second side of the left cap such that the seal of the left cap prevents the first flow of air from leaking;
   a first scroll shroud (1000) coupled to one side of the first scroll volute so as to surround the first impeller, the first scroll shroud shaped to generate pressure in the first flow of air when the first impeller is rotated;
   a first nozzle (1100) configured to act as a suction port through which the first flow of air flows, and the first nozzle being coupled to one side of the first scroll shroud (1000);
   a fan shroud (1250) connected to a first side of the right cap to prevent the cooling air from leaking;
   a fan scroll (1300) covering the cooling fan and discharging the cooling air to outside the fan shroud;
   a cooling duct (550) coupled to one side of the fan scroll to discharge the cooling air from the fan scroll;
   a second impeller (800') arranged on a second side of the right cap opposite the first side of the right cap;
   a second scroll volute (900') covering one side of the second impeller, the second scroll volute shaped to guide a second flow of air generated by the second impeller, and to convert kinetic energy of the second flow of air into potential energy;
   a second scroll shroud (1000') coupled to one side of the second scroll volute so as to surround the second impeller, the second scroll shroud shaped to generate pressure in the second flow of air when the second impeller is rotated; and
   wherein the motor casing (100) has: a plurality of first holes (110) formed along an outer diameter of the motor casing at a first predetermined interval around the first core ring at the first end of the motor casing facing the left back plate (400); a plurality of second holes (120) formed along the outer diameter of the motor casing at a second predetermined interval around the second core ring at the second end of the motor casing opposite the first end and facing the right back plate (600); and
   a plurality of third holes (130) having a diameter smaller than a diameter of the plurality of first holes and a diameter of the plurality of second holes, the plurality of third holes formed along the outer diameter of the motor casing around the motor casing at the second end of the motor casing, the plurality of third holes located at a predetermined distance from the plurality of second holes, and wherein when the cooling fan is operated,
   (1) air (B) is introduced through the second holes and flows across the stator in a direction from the second end of the stator to the first end of the stator to cool the stator,
   (2) air (A) is introduced through the plurality of first holes, and the air (A) and the air (B) flow across the rotor in a direction from the first end of the stator to the second end of the stator, such that the first end of the coil part and a center portion of the coil part, the bearing housing (700), and the rotor (250) are cooled by the air (A),
   (3) air (C) is introduced through the plurality of third holes, and the air (C), the air (A), and the air (B) cool the second end of the coil part and the bearing housing (700') facing the second impeller (800'), and
   (4) air (D), corresponding to the air (A), the air (B), and the air (C) having circulated through an inside of the motor casing, is discharged outside through the cooling duct.

2. The direct type dual turbo blower cooling structure as claimed in claim 1, further comprising a port part (1150) connected to the first nozzle so as to measure a flow rate.

3. The direct type dual turbo blower cooling structure as claimed in claim 1, wherein each of the core rings (300) has a plurality of cooling air passage holes (310) through which cooling air passes.

* * * * *